United States Patent
Yoshida

(10) Patent No.: US 10,449,922 B2
(45) Date of Patent: Oct. 22, 2019

(54) AIR-BAG

(71) Applicant: SUMISHO AIRBAG SYSTEMS CO., LTD., Matsuura-shi, Nagasaki (JP)

(72) Inventor: Masatoshi Yoshida, Matsuura (JP)

(73) Assignee: SUMISHO AIRBAG SYSTEMS CO., LTD., Matsuura-Shi, Nagasaki (JP)

( * ) Notice: Subject to any disclaimer, the term of this patent is extended or adjusted under 35 U.S.C. 154(b) by 0 days.

(21) Appl. No.: 15/522,946

(22) PCT Filed: Nov. 5, 2015

(86) PCT No.: PCT/JP2015/081161
§ 371 (c)(1),
(2) Date: Apr. 28, 2017

(87) PCT Pub. No.: WO2016/080199
PCT Pub. Date: May 26, 2016

(65) Prior Publication Data
US 2017/0334388 A1 Nov. 23, 2017

(30) Foreign Application Priority Data
Nov. 5, 2015 (JP) .................... 2014-235820

(51) Int. Cl.
*B60R 21/233* (2006.01)
*B60R 21/23* (2006.01)
(Continued)

(52) U.S. Cl.
CPC ............ *B60R 21/233* (2013.01); *B60R 21/23* (2013.01); *B60R 21/232* (2013.01);
(Continued)

(58) Field of Classification Search
CPC ... B60R 21/232; B60R 21/233; B60R 21/235; B60R 2021/23324; B60R 2021/23566
See application file for complete search history.

(56) References Cited

U.S. PATENT DOCUMENTS 6,273,465 B1 * 8/2001 Cress .................... B60R 21/233
280/748
7,883,112 B2 * 2/2011 Wold .................... B60R 21/232
280/743.1
(Continued)

FOREIGN PATENT DOCUMENTS

EP 2 206 631 A1 7/2010
JP 2004-34766 A 2/2004
(Continued)

OTHER PUBLICATIONS

International Search Report, issued in PCT/JP2015/081161 (PCT/ISA/210), dated Jan. 19, 2016.
(Continued)

*Primary Examiner* — Barry Gooden, Jr.
(74) *Attorney, Agent, or Firm* — Birch, Stewart, Kolasch & Birch, LLP

(57) ABSTRACT

Provided is an air-bag capable of further reducing damage value to a passenger and limiting the amount of use of inflator gas by limiting an excessive increase in the internal pressure of the air-bag upon contacting the passenger while increasing the speed of deployment in a passenger protection area. The air-bag includes a main chamber and a sub-chamber that are connected via a communication portion, wherein the communication portion or a region adjacent to the communication portion is configured of a multilayer structure portion comprising three or more layers.

16 Claims, 8 Drawing Sheets

(51) Int. Cl.
*B60R 21/232* (2011.01)
*B60R 21/235* (2006.01)

(52) U.S. Cl.
CPC .. *B60R 21/235* (2013.01); *B60R 2021/23324* (2013.01); *B60R 2021/23509* (2013.01); *B60R 2021/23542* (2013.01)

(56) References Cited

U.S. PATENT DOCUMENTS

| | | | | |
|---|---|---|---|---|
| 8,757,657 B1* | 6/2014 | Hotta | ............. | B60R 21/233 280/730.2 |
| 9,533,652 B1* | 1/2017 | Paxton | ............. | B60R 21/239 |
| 9,663,062 B2* | 5/2017 | Rohn | ............. | B60R 21/2338 |
| 2002/0135164 A1* | 9/2002 | Thomas | ............. | B60R 21/205 280/732 |
| 2003/0034637 A1* | 2/2003 | Wang | ............. | B60R 21/233 280/729 |
| 2003/0155750 A1* | 8/2003 | Hu | ............. | B60R 19/205 280/730.1 |
| 2004/0119270 A1* | 6/2004 | Gu | ............. | B60R 21/232 280/730.2 |
| 2008/0084052 A1* | 4/2008 | Abney | ............. | B60R 21/232 280/730.2 |
| 2008/0309056 A1* | 12/2008 | Ohba | ............. | B60R 21/232 280/730.2 |
| 2009/0152846 A1* | 6/2009 | Choi | ............. | B60R 21/233 280/729 |
| 2011/0057425 A1* | 3/2011 | Fink | ............. | B60R 21/232 280/730.2 |
| 2011/0298200 A1 | 12/2011 | Taniguchi et al. | | |
| 2013/0133971 A1* | 5/2013 | Rick | ............. | B60R 21/36 180/274 |
| 2013/0200598 A1* | 8/2013 | Honda | ............. | B60R 21/20 280/730.2 |
| 2013/0341894 A1* | 12/2013 | Nakashima | ............. | B60R 21/233 280/730.2 |
| 2014/0239617 A1* | 8/2014 | Dix | ............. | B60R 21/233 280/728.2 |
| 2014/0265275 A1* | 9/2014 | Rickenbach | ............. | B60R 21/232 280/739 |
| 2015/0021887 A1* | 1/2015 | Hiraiwa | ............. | B60R 21/233 280/729 |
| 2015/0210240 A1* | 7/2015 | Tanaka | ............. | B60R 21/235 442/189 |
| 2015/0367811 A1* | 12/2015 | Kobayashi | ............. | B60R 21/2346 280/730.2 |
| 2016/0159310 A1* | 6/2016 | Kobayashi | ............. | B60R 21/233 280/729 |
| 2016/0221528 A1* | 8/2016 | Sugimura | ............. | B60R 21/23138 |
| 2017/0036636 A1* | 2/2017 | Masuda | ............. | B60R 21/233 |
| 2017/0057453 A1* | 3/2017 | Morris | ............. | B60R 21/233 |
| 2017/0106830 A1* | 4/2017 | Rohn | ............. | B60R 21/232 |

FOREIGN PATENT DOCUMENTS

| | | |
|---|---|---|
| JP | 2008-58242 A | 3/2008 |
| JP | 2009-73220 A | 4/2009 |
| JP | 2010-188881 A | 9/2010 |
| JP | 2011-020528 | 2/2011 |
| JP | 2011-255714 A | 12/2011 |

OTHER PUBLICATIONS

Supplementary European Search Report issued in corresponding European Application No. 15862072.4 dated May 15, 2018.

* cited by examiner

AIR-BAG

TECHNICAL FIELD

The present invention relates to an air-bag that is deployed and inflated by inflow of inflation gas supplied from an inflator for protecting an occupant when an automobile collides with another automobile or an obstacle, the air-bag capable of reducing an injury criterion value to the occupant, and suppressing the use amount of the inflator gas.

BACKGROUND ART

Most passenger automobiles currently manufactured have so-called driver's seat and front-passenger's seat air-bags installed therein that, when the front side of the an automobile collides with another automobile or an obstacle (head-on collision), rapidly inflates a bag between the passenger and an automobile interior structure to ensure the safety of the occupant.

In recent years, more and more automobiles include a curtain air-bag system mounted thereto to protect the head and other parts of the occupant not only in case of the head-on collision but also in a case where the side of the automobile collides with another automobile or an obstacle (side collision). The curtain air-bag system is stored as folded in the ceiling section above the side window sections or in the pillar sections of an automobile, and inflates so as to cover the side window sections upon a collision.

In such an air-bag, it is required to keep a high deployment speed upon deployment and inflation to cover the occupant protection area earlier, and reduce the injury criterion value against a human body.

Patent Literature 1 discloses an air-bag which includes an inflation portion formed in an occupant protection area and a sub-chamber formed outside the protection area, as means of reducing the injury criterion value against the occupant upon occupant restraint by the air-bag.

However, in an air-bag including a sub-chamber in communication with the protection area as described in Patent Literature 1, since gas inflows to the sub-chamber in a stage where the pressure of the inflation portion has not sufficiently risen, it was necessary to increase the capacity of the inflator to raise the pressure of the inflation portion to a sufficient pressure for occupant restraint.

Patent Literature 2 discloses an air-bag including a communication portion between a cushion chamber which is inflated by introduction of gas, and an internal pressure control chamber, in which ventilation control means which opens when the gas pressure in the cushion chamber becomes not less than a predetermined value is provided in the communication portion.

However, it is not easy to control variation of the pressure upon opening the communication portion with the ventilation control means as shown in Patent Literature 2, which is formed by adhesion by an adhesive, welding, or suturing with a suture.

CITATION LIST

Patent Literature

PATENT LITERATURE 1: JP-A-2004-034766
PATENT LITERATURE 2: JP-A-2008-056242

SUMMARY OF INVENTION

Technical Problem

It is an object of the present invention to provide an air-bag which suppresses repulsion by suppressing pressure rise of a main chamber upon contact with an occupant while keeping a high deployment speed in the main chamber in an early stage of deployment, and efficiently absorbs the kinetic energy of the occupant. Further, it is another object of the present invention to provide an air-bag which can decrease the gas capacity of the inflator.

Solution to Problem

To solve the above described problem, the present invention is an air-bag including a main chamber and a sub-chamber, wherein the main chamber and the sub-chamber are connected via a communication portion, and the communication portion or a region adjacent to the communication portion is made up of a multilayer structure portion including three or more layers.

In another embodiment of the present invention, one or more internal joining portions each of which joins two pieces of fabric constituting the air-bag are disposed in a vicinity of the communication portion.

Further, in yet another embodiment of the present invention, the air-bag is integrally formed by hollow weaving.

Further, in yet another embodiment of the present invention, a curtain air-bag apparatus utilizing the air-bag is provided.

DESCRIPTION OF EMBODIMENTS

Figure 1:
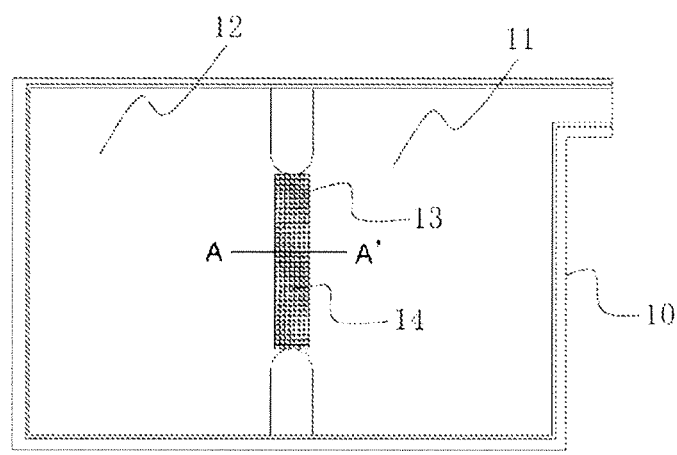
FIG. 1 shows an example of the air-bag of the present invention.

FIG. 1 shows an example of the air-bag of the present invention. An air-bag 10 of the present invention includes a main chamber 11 and a sub-chamber 12, in which the main chamber 11 and the sub-chamber 12 are connected via a communication portion 13, and the communication portion is made up of a multilayer structure portion 14 having three or more layers.

Figure 2A:
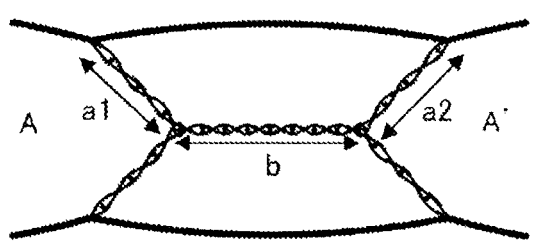
FIG. 2A is a schematic view to show an A-A' cross-section of the air-bag of FIG. 1.
Figure 2B:
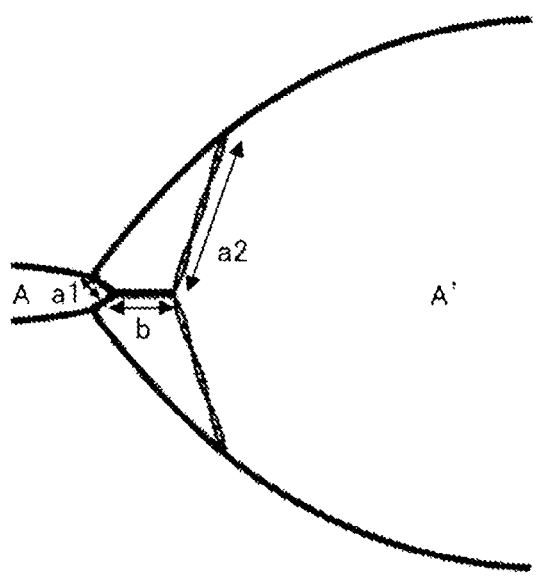
FIG. 2B shows a state of inflation procedure regarding FIG. 2A.
Figure 2C:
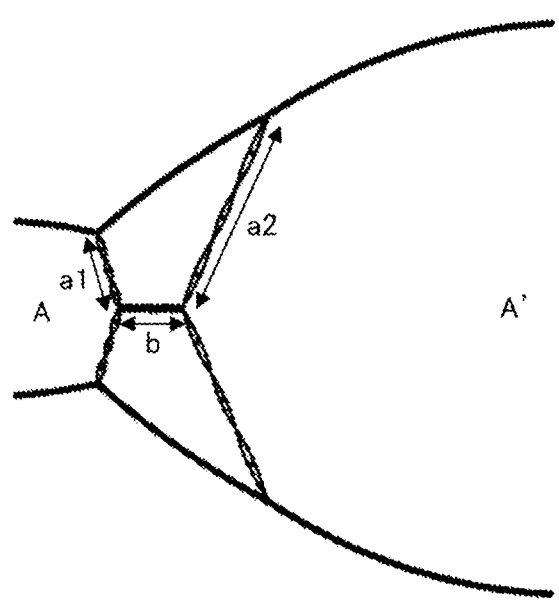
FIG. 2C shows a state of inflation procedure regarding FIG. 2A.

FIG. 2A illustrates a cross-section of an A-A' section of FIG. 1. In the example of FIG. 2A, warps and wefts taken out from the fabric constitute a woven structure, thereby forming intermediate layers a1, a2, and b. The air-bag 10 of the present invention first starts inflating from the main chamber 11 upon deployment. A three-layer portion b of the multilayer structure portion 14 disposed in the communication portion 13 gives rise to yarn slippage within the multilayer structure portion 14 when the main chamber inflates, and the three-layer portion b moves in the direction to the four-layer portion a1 on the sub-chamber side, causing the opening of the communication portion to become smaller (FIG. 2B). As a result of that, it becomes more likely that gas does not flow into the sub-chamber until the pressure of the main chamber reaches a fixed level, so that internal pressure rise of the main chamber takes place quickly. Thereafter, when an occupant comes into contact with the main chamber portion, and the internal pressure of the main chamber further rises, the threads of the intermediate layers a1, a2, and b further extend and move, thus resulting in yarn slippage (FIG. 2C). As a result, the opening of the communication portion becomes larger, and it becomes easier for the gas to pass through the communication portion, and the sub-chamber starts to inflate so that the internal pressure of the main chamber is reduced, and thus a damage value which an occupant experiences can be reduced.

Figure 3:
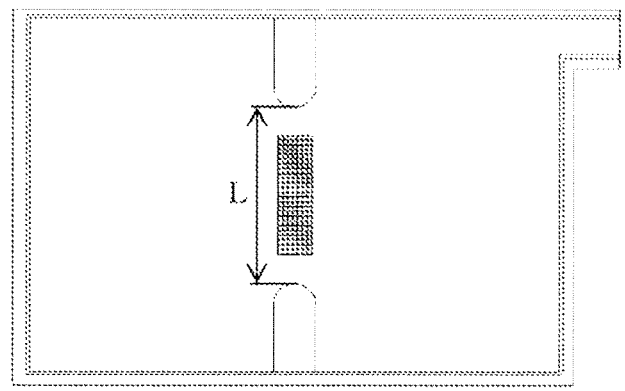
FIG. 3 shows an example of the air-bag of the present invention, in which a multilayer structure portion is disposed in a part of a communication portion.

Although the multilayer structure portion does not necessary need to cover the entire surface of the communication portion, and may be disposed in a part of the communication portion as shown in FIG. 3, it may be preferably disposed over a length of not less than ½, preferably not less than ⅔ of an opening length L of the communication portion to increase the deployment speed of the main chamber.

Figure 4:
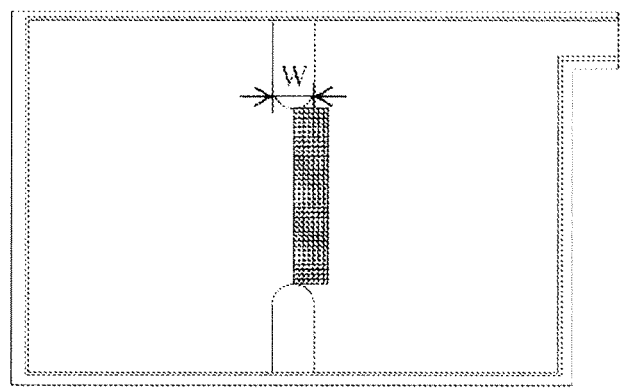
FIG. 4 shows an example of the air-bag of the present invention, in which a multilayer structure portion is disposed offset from a center of the communication portion toward the main chamber side.

Moreover, when the multilayer structure portion is disposed in the communication portion as shown in FIG. 4, although the multilayer structure portion may be disposed so as to be offset toward the main chamber side or toward the sub-chamber side from the center of the communication portion, it is preferable that the sub-chamber side of the multilayer structure portion is disposed within a range of a width W of the communication portion.

Figure 5:
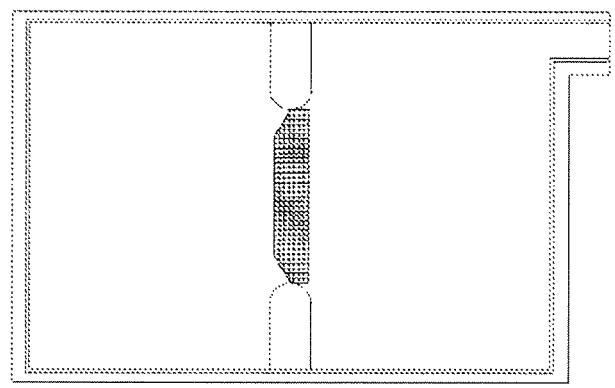
FIG. 5 shows an example of the air-bag of the present invention, in which the width of the multilayer structure portion is varied between at a middle portion and at an end portion of the communication portion.

Although the multilayer structure portion can have any shape, it is also possible to adjust the flow of gas through the communication portion by varying the width of the multiplayer structure portion between at a middle portion and at an end portion of the communication portion, as shown in FIG. 5.

Figure 6:
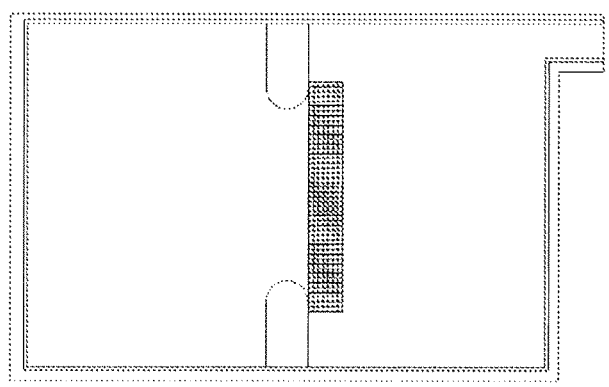
FIG. 6 shows an example of the air-bag of the present invention, in which the multilayer structure portion is disposed on the side of the main chamber in a region adjacent to the communication portion.

Even if the above described multilayer structure portion is disposed in a region adjacent to the communication portion as shown in FIG. 6, it can provide similar effects as when disposed in the communication portion.

Although the above described multilayer structure portion includes a three-layer weave, a four-layer weave, or a further multilayer weave, it is preferably made up of a combination of three-layer weave to four-layer weave considering the fabric strength of each layer.

Although weave density of each layer of the above described multilayer structure portion is not specifically defined, it is preferable that the surface layer utilizes a weave having a weave density higher than that of an intermediate layer so as to have air tightness.

Figure 7:
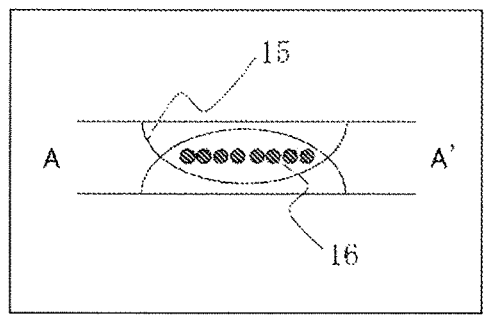
FIG. 7 is a schematic view of a multilayer structure portion to be used in the present invention, showing a woven structure in which warps and wefts are simply hooked to each other.
Figure 8:
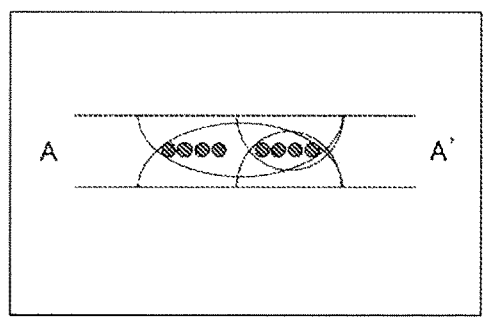
FIG. 8 is a schematic view of a multilayer structure portion to be used in the present invention, showing an example of a structure in which the structure of FIG. 7 is disposed in multiple stacks.

The intermediate layer of the above described multilayer structure portion does not need to be organized to have a woven structure, and it may have, as shown in FIG. 7, a structure in which warps 15 are simply hooked to wefts 16, or wefts 15 are hooked to warps 16. And, it may be formed by combining such structures into multiple stacks as shown in FIG. 8. In the case of the hooking structure, although the number of threads 16 to be hooked is not particularly limited, 3 to 20 of them are preferable, and 6 to 14 are more preferable. When the number of threads 16 to be hooked is too small, they become likely to be broken upon deployment so that the objective of the present invention is not achieved.

Figure 9:
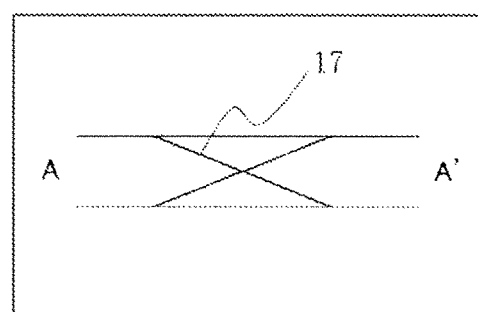
FIG. 9 is a schematic view of a multilayer structure portion to be used in the present invention, showing an example of a woven structure made up of limiting line of threads alone in which a warp or a weft constituting a hollow weave interconnects two pieces of fabric by being extended from one fabric to the other one.

The intermediate layer of the multilayer structure portion includes a woven structure which is made up of solely a limiting line of thread joining two pieces of fabric by arranging warps or wefts 17 which constitute a hollow weave to extend from one of the fabric to the other as shown in FIG. 9.

Figure 10:
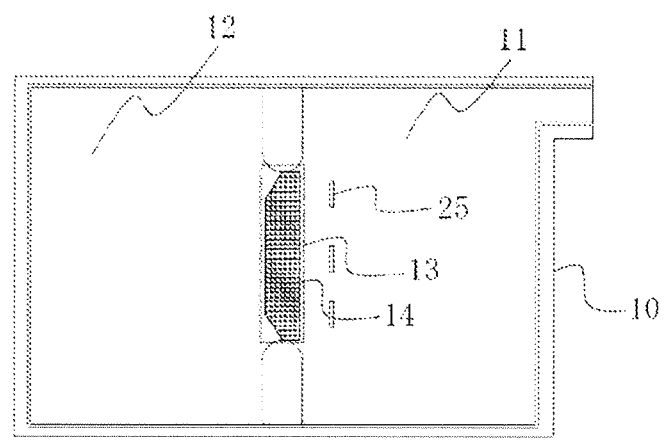
FIG. 10 shows an example of the air-bag of the present invention, in which an internal joining portion is disposed in the vicinity of the communication portion on the side of the main chamber.

Further, FIG. 10 is an example in which an internal joining portion 25 that joins two pieces of fabric is disposed in the vicinity of the communication portion. Disposing the internal joining portion in the vicinity of the communication portion allows to adjust by its position an opening amount of the multilayer structure portion upon inflation of the main chamber, thereby controlling the amount of gas flowing into the sub-chamber. The internal joining portion may be made up of a hollow weave, or may be constructed by sewing.

The internal joining portion may be located at a position of about 0 mm to 150 mm from the multilayer structure portion which is disposed in the communication portion or a region adjacent to the communication portion, more preferably at a position of about 0 mm to 100 mm. Moreover, the internal joining portion exhibits its effect even when it is located on the side of the sub-chamber which inflates with a delay.

The opening length L of the communication portion used in the present invention is preferably about 80 mm to 300 mm, and more preferably 120 mm to 200 mm.

Although the width W of the multilayer structure portion 14 is not particularly specified, it is preferably about 5 mm to 100 mm, and more preferably about 20 mm to 60 mm.

Further, although, in the example, the main chamber and the sub-chamber are directly in communication with each other via the communication port, an inflation portion may be interposed between the main chamber and the sub-chamber.

The fineness of the warp and the weft of the fabric used in the present invention may be selected from the thickness of the threads typically used for an air-bag fabric, that is, the range of from 150 to 1000 dtex, and preferably within the range of from 235 to 700 dtex. If the fineness is smaller than 150 dtex, the resulting fabric tends to hardly achieve the strength required for air-bag, and if the fineness is greater than 1000 dtex, the resulting fabric tends to have excessive mass per unit area.

The threads used in the present invention may have the same or different single filament thicknesses with each other, which are preferably within a range of, for example, 0.5 to 6 dtex. Moreover, the threads may have a strength of single filaments of not less than 7 cN/dtex, and preferably not less than 8 cN/dtex. Further, a cross-sectional shape of the single filaments may be selected as appropriate from a circular, elliptical, flat, polygonal, hollow, and other shapes as long as it causes no problem to manufacturing and properties of the woven fabric. Also, a plurality of threads with different finenesses and cross-sectional shapes may be combined by such as doubling, and twisting, to be used.

The fabric made up of the above described threads and used in the present invention preferably has a mass per unit area of not more than 260 g/m$^2$, and a tensile strength of not less than 650 N/cm. A fabric having a mass per unit area and a tensile strength within the ranges above is considered to be lightweight and excellent in physical properties. Note that the term mass per unit area means the weight of an unprocessed fabric before application of an impervious material to be described later or the like.

In the fabric has a mass per unit area of more than 260 g/m$^2$, the air-bag is increased in weight and hardly achieves a desired weight reduction. Also, if the fabric has a tensile strength of 650 N/cm or less, the air-bag could fail to achieve required physical properties.

The woven fabric used in the present invention preferably has a cover factor, which is an index of the denseness of the woven fabric structure, of 700 or more, and more preferably 750 or more.

The cover factor (CF) is typically obtained by the product of the woven fabric density N (number/cm) with the thickness D (dtex) of the warps and the wefts of the woven fabric, and expressed by the following expression.

$$CF = Nw \times \sqrt{Dw} + Nf \times \sqrt{Df}$$

Here, Nw and Nf are respectively the weave densities (number/cm) of the warps and the wefts, and Dw and Df are respectively the thicknesses (dtex) of the warps and the wefts.

The weaving machine for manufacturing the fabric for the air-bag of the present invention may be appropriately selected from various weaving machines used for weaving ordinary industrial woven fabrics, including a shuttle weaving machine, a water-jet weaving machine, an air-jet weaving machine, a rapier weaving machine, and a projectile weaving machine.

The fiber threads constituting the air-bag fabric of the present invention may include natural fibers, chemical fibers, inorganic fibers, and are not specifically limited. In particular, synthetic fiber filaments are preferable from the viewpoint of its general-purpose use, manufacturing processes of the fabric, and the properties of the fabric. For example, one or two or more fibers may be selected from aliphatic polyamide fiber obtained by polymerization, copolymerization, or blending of nylon 6, nylon 66, nylon 46, nylon 610, nylon 612, and the like, copolymerized polyamide fiber of an aliphatic amine represented by nylon 6T, nylon 6I, and nylon 9T and an aromatic carboxylic acid, polyester fiber obtained by polymerization, copolymerization, or blending of polyethylene terephthalate, polytrimethylene terephthalate, polybutylene terephthalate, polyethylene naphthalate, and the like, ultra-high molecular weight polyolefin fiber, chlorofiber such as vinylidene and polyvinyl chloride, fluorine-based fiber containing polytetrafluoroethylene, polyacetal-based fiber, polysulfone-based fiber, polyphenylenesulfide-based fiber (PPS), polyetheretherketone-based fiber (PEEK), wholly aromatic polyamide fiber, wholly aromatic polyester fiber, polyimide-based fiber, polyetherimide-based fiber, polyparaphenylenebenzobisoxazole-based fiber (PBO), vinylon-based fiber, acrylic-based fiber, cellulose-based fiber, silicon carbide-based fiber, alumina-based fiber, glass-based fiber, carbon-based fiber, steel-based fiber, and the like. Particularly, nylon 66 fiber and polyester-based fiber are preferable in terms of physical properties, durability, and heat resistance. Also, polyester-based fiber and nylon 6 fiber are also preferable from the viewpoint of recycling.

These fiber threads may contain one or two or more additives as selected from typically used various additives for improving spinnability, processability, and durability. Examples of the additives include heat stabilizers, antioxidants, light stabilizers, aging retarders, lubricants, smooth finishing agents, pigments, water-repellents, oil-repellents, masking agents such as titanium oxide, lustering agents, fire retardants, plasticizers, and the like. Moreover, the threads may be process by twisting, bulking, crimping, winding, and sizing. Furthermore, the threads may be in the form of staple spun threads other than the form of continuous filaments, or composite threads thereof.

Further the woven fabric used in the present invention preferably has an impervious material in terms of ensuring airtightness of the air-bag. The impervious material is a material that substantially prevents air from passing therethrough, for example as described below, and the term impervious means providing a zero reading in A method (Frazier method) of JIS L1096 (Testing methods for general woven fabrics). This impervious material is applied to the woven fabric from one or both sides thereof by a method to be described later. The impervious material may lie in any of the surface of the fabric, intersection portions of thread bundles constituting the fabric, or gap portions of the fiber single filaments, or the like.

The application method may include 1) a coating method (e.g., knife, kiss, reverse, comma, slot die, or lip), 2) a dipping method, 3) a printing method (e.g., screen, roll, rotary, or gravure), 4) a transferring method (transfer), and 5) a laminating method. Among them, the coating method and the laminating method are preferable in that the obtained fabric effectively maintains the inner pressure.

The impervious material may be anything typically used for air-bag fabric if it satisfies, for example, the heat resistance, the wear resistance, the adhesion to the fabric, the flame retardancy, and the tack freeness. As the material, one or two or more materials out of silicone-based resins or rubbers, polyurethane-based resins or rubbers (including those modified with silicone or fluorine), fluorine-based resins or rubbers, chlorine-based resins or rubbers, polyester-based resins or rubbers, polyamide-based resins or rubbers, epoxy-based resins, vinyl-based resins, urea-based resins, phenol-based resins, and the like may be used.

Among them, silicone resins are preferable in terms of the heat resistance and the flame retardancy.

The properties and condition of the material as a solution may be selected as appropriate from a solventless type, solvent type, water dispersion type, water emulsion type, water soluble type, or the like in accordance with the application amount, application method, processability and stability of the material, required characteristics, and the like.

When adopting the coating method, the application amount for one surface is preferably 10 to 150 g/m$^2$, and more preferably 50 to 100 g/m$^2$. If the material forms a layer, the layer preferably has a thickness of 10 μm or more. If the application amount for one surface is less than 10 g/m$^2$ or the material layer has a thickness of less than 10 μm, the obtained fabric tends to be difficult to achieve the required airtightness.

When adopting the laminating method, the processing method is not specifically limited, and known methods are available including a dry lamination method in which an adhesive is applied onto a fabric or a film and dried to evaporate the solvent and then the lamination is thermocompressed, a wet lamination method in which a water-soluble adhesive is applied to a fabric or a film to bonded them together, and then the adhesive is dried, an extrusion lamination method in which a molten resin is extruded onto a fabric before laminating the fabric and a film, a thermal lamination method in which a resin layer formed in a film shape in advance is laminated and then the lamination is thermocompressed, and the thermal lamination method is preferable from the viewpoint of processing costs and ecology.

The material to be laminated is not specifically limited either, and known materials can be used including homopolymers or copolymers of polyester-based resins, polyamide-based resins, polyolefin-based resins, copolymers of these resins with other materials, and modifications thereof. Also, known methods can be used such as processing the material with an adhesion imparting agent like a polyolefin-based resin in advance, or processing a fabric with a film having an adhesive layer placed on one surface thereof. Examples of thermoplastic resins used as the adhesive layer include homopolymers and copolymers of polyamide-based resins, polyolefin-based resins, polyurethane-based resins, copolymers of these resins with other materials, and modifications thereof that have a melting point of 200° C. or lower.

The thickness of the lamination coating material is not specifically limited either, and may be appropriately set within the range of from 10 to 100 μm according to the application. In general, a thickness of from 10 to 40 μm is preferable for a curtain air-bag that is not intended for overturn of the automobile, and a thickness of from 40 to 100 μm is preferable for a hollow weave curtain bag that is also intended to protect the occupants in case of overturn of the automobile.

The impervious material may have one or two or more additives mixed thereto as selected from typically used various additives for improving the processability, the adhesiveness, the surface properties, the durability or the like, in addition to the main material. Examples of the additives include crosslinking agents, tackifiers, reaction accelerators, reaction retarders, heat stabilizers, antioxidants, light stabilizers, aging retarders, lubricants, smooth finishing agents, antiblock gents, pigments, water-repellents, oil-repellents, masking agents such as titanium oxide, lustering agents, fire retardants, plasticizers, and the like.

Various pre-treatment agents, adhesion improvers, and the like may be added to the impervious material in order to improve adhesion with the fabric, or the surface of the fabric may be pre-treated with a primer treatment or the like. Further, in order to improve the physical properties of the material or impart heat resistance, aging resistance, antioxidant properties, and the like, after application of the material to the fabric, it may be dried, cross-linked, vulcanized, for example, by hot air treatment, pressurized heat treatment, or high energy treatment (high frequency, electron beam, UV ray).

In the case of hollow weaving, the fabric is typically woven using sized original threads as warps, and in order to remove oils, sizing agents, and the like adhering to the original threads prior to the coating and laminating, so as not to inhibit adhesiveness of the coating agent or laminating material to the fabric, the fabric is preferably scoured by a jigger scouring machine or a continuous scouring machine with a plurality of scouring baths. After the scouring, the woven fabric is dried with a cylinder dryer or the like. After the drying, the fabric is directly subjected to the subsequent coating step in some cases, but preferably it is successively subjected to heat setting following the scouring and the drying for controlling the dimension and the woven fabric density.

After coating or lamination processing, the fabric is cut to predetermined dimensions and a shape by a laser cutter, undergoes some process such as sewing accessories like a strap for fixing the air-bag, to the fabric and reinforcing a mounting portion to the vehicle body, and after that the fabric is made into a product.

The specifications, shape, and capacity of the air-bag of the present invention may be selected according to the part to which the air-bag is disposed, its application, the storage space, the performance of absorbing occupant impact, the output of the inflator, and the like.

For restricting protrusion of the air-bag toward the occupant and controlling the thickness during the inflation, the air-bag may be provided with a tether or a gas flow adjustment cloth on the inside and a strip-shaped cloth or a holding cloth called a flap on the outside.

A heat-resistant protective cloth for protection against hot gas or a mechanical reinforcing cloth may be provided around the inflator nozzle according to the characteristics of the inflator to be used. The protective cloth and reinforcing cloth may be formed from a woven fabric that is formed from a heat resistant material like a heat resistant fiber material such as wholly aromatic polyamide fiber, wholly aromatic polyester fiber, PBO fiber, polyimide fiber, or fluorine-containing fiber, or a fabric manufactured separately using threads having a thickness that is equal to or thicker than that of the air-bag fabric. Also, a woven fabric to which a heat resistant coating material has been applied may be used.

The air-bag may be folded in such manner as folding screen fold of folding the air-bag from the center symmetrically in vertical or horizontal direction or fold of compressing the air-bag toward the center in several directions as in the driver's seat air-bag, roll fold, bellows fold, or fanfold fold in a folding screen like manner as in the front-passenger's seat air-bag, combination thereof, alligator fold as in the side bag built into the seat, or roll fold or bellows fold as in the side curtain air-bag.

The air-bag of the present invention can be applied into several applications in passenger vehicles, commercial cars, buses, and motorcycles such as several occupant protection bags including side bags and side curtain air-bags at the driver's seat and the front-passenger's seat for head-on collision or side collision, head rest bags for rear seat protection, rear-end collision protection, knee bags and foot bags for leg portion and foot portion protection, mini-bags for infant protection (child seat), bags for air-belts, and air-bags for pedestrian protection, and also can be applied to other variety of applications in ships, trains and electric trains, planes, and amusement facilities if the air-bag is functionally satisfactory.

Examples

Hereinafter, the present invention will be described further specifically based on an Example. A production method of air-bags, and an evaluating method of the performance of air-bag characteristics, which were employed in the Example, will be described below.

The air-bag itself was constructed by hollow weaving of a single-side warp density of 57/inch and a weft density of 49/inch by using Nylon 66 fiber of 470 dtex.

The surface of the fabric was subjected to silicon coating of a base coat of 80 g/m$^2$ and a top coat of 10 g/m$^2$ by knife coating.

Figure 11:
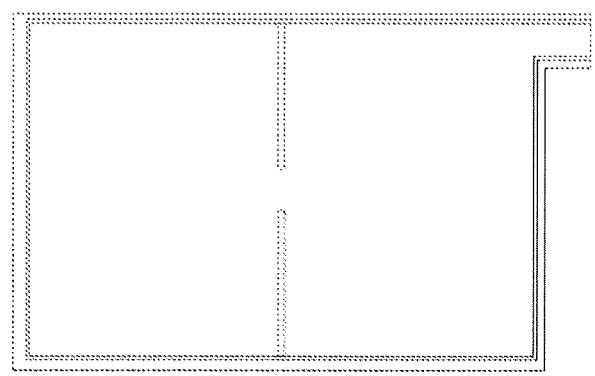
FIG. 11 shows an air-bag used as a Comparative Example, showing an example in which no multilayer structure is disposed in the communication portion.

FIG. 5 shows a configuration of a curtain air-bag used in the Example. The multilayer structure portion of the communication portion utilized the pattern shown in FIG. 8. FIG. 11 shows an air-bag used as a Comparative Example, which is an example of a curtain air-bag in which no multilayer structure portion was disposed in the communication portion.

Using an air-bag deployment test apparatus (a cold gas system manufactured by Microsys Technologies Inc.) which ejects helium gas at a high speed, internal pressure changes of the main chamber and the sub-chamber upon deployment of the air-bag were observed. Tests were conducted by setting the supply pressure to 6.5 MPa and 8.0 MPa under test conditions of a tank capacity of 0.75 L and an orifice φ of 0.4 inches.

Figure 12:
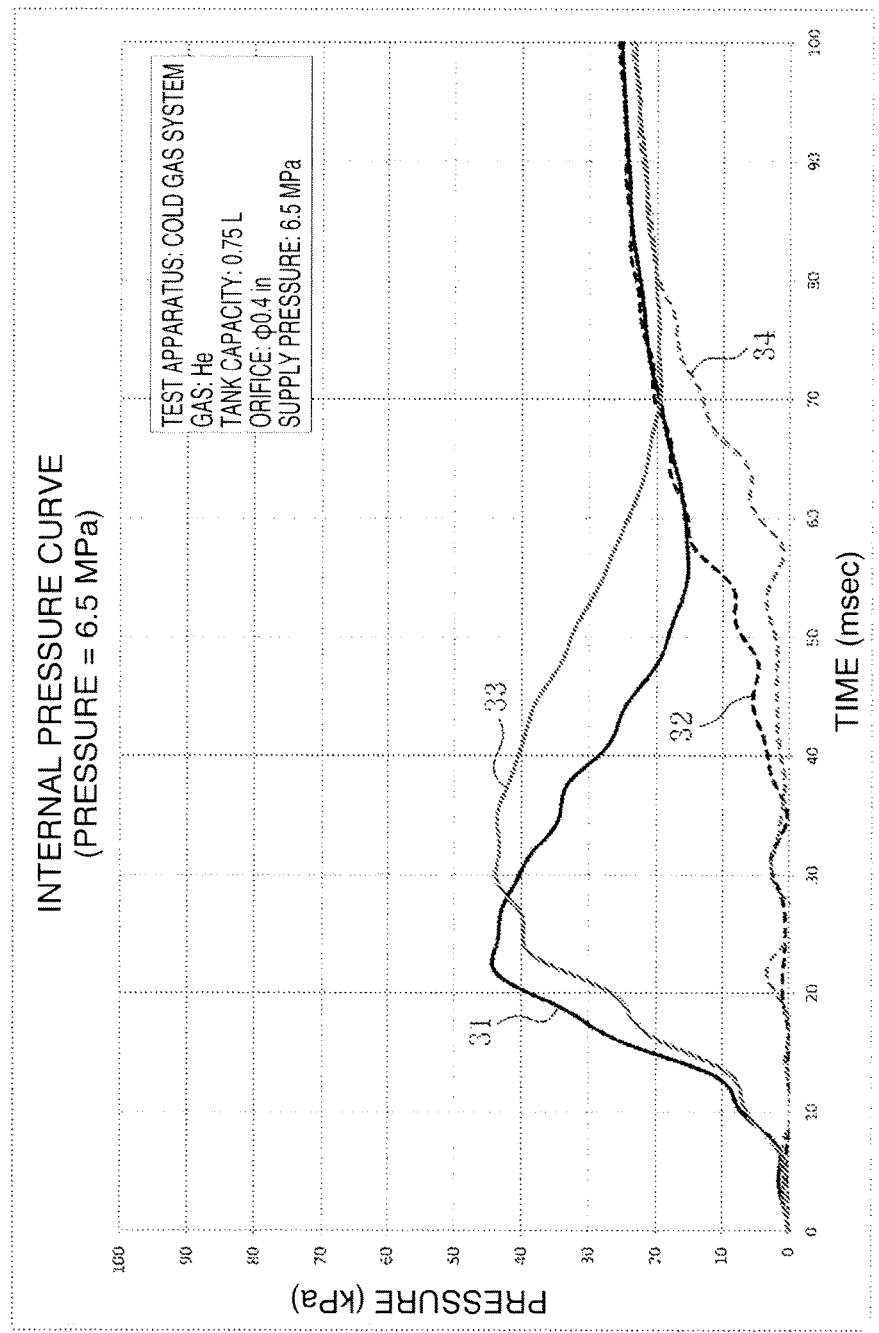
FIG. 12 is an internal pressure graph of an air-bag deployment test of an Example and the Comparative Example.

FIG. 12 shows test results of the deployment test conducted with a supply pressure of 6.5 MPa. The vertical axis indicates pressure (kPa) and the horizontal axis indicates time (msec). Lines 31 and 32 show the internal pressure curves of the Example, and lines 33 and 34 indicate the internal pressure curves of the Comparative Example. Moreover, solid lines 31 and 33 indicate internal pressure curves of the main chamber, and broken lines 32 and 34 indicate the internal pressure curves of the sub-chamber.

As a result of conducting deployment by the cold gas system, it was found that a rise in the internal pressure of the main chamber occurred earlier in the Example than in the Comparative Example in an early stage of deployment. This indicates that the woven structure disposed in the communication portion hindered the gas flowing into the sub-chamber, and a larger part of the gas was used for internal pressure rise of the main chamber. On the other hand, when the internal pressure of the main chamber reached not less than a fixed level, the woven structure disposed in the communication portion gave rise to yearn slippage, which caused the gas to start flowing to the side of the sub-chamber, resulting in a fall of the pressure of the main chamber. The speed of the fall was faster with respect to the Comparative Example. That is, the air-bag shown in the Example exhibits a faster deployment speed than that of the Comparative example, and when the air-bag internal pressure rises after contact with an occupant, it is possible to prevent excessive internal pressure rise of the main chamber by causing larger amount of gas to flow to the sub-chamber, thereby reducing a damage value which the occupant experiences.

Figure 13:
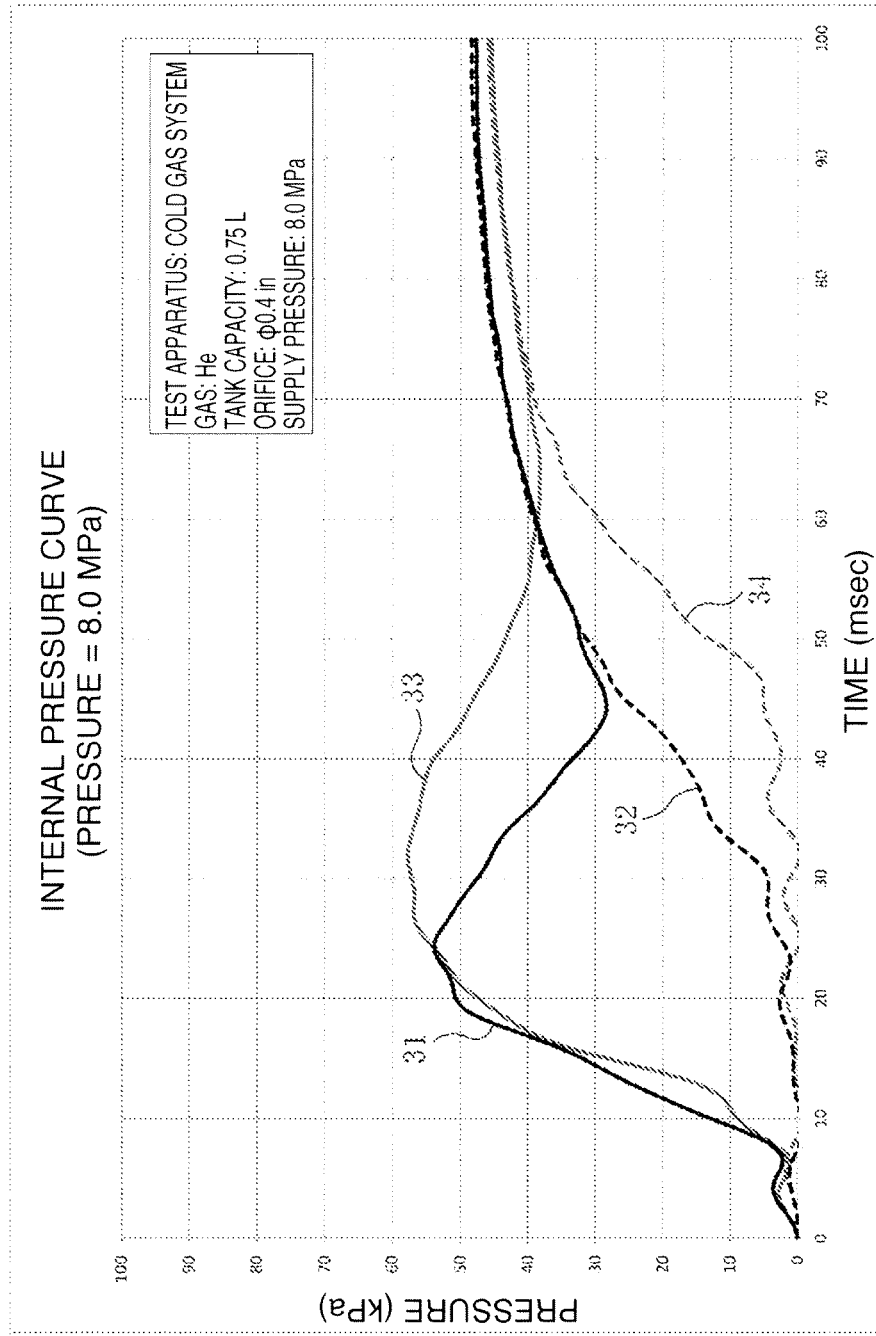
FIG. 13 is an internal pressure graph of an air-bag deployment test of the Example and the Comparative Example.

FIG. 13 shows an example in which the tank pressure upon deployment was raised to 8.0 MPa in the air-bags of the same Example and the Comparative Example, thereby increasing the output of the gas to be supplied. It is seen that in the Example, the rising speed of internal pressure was faster compared to the Comparative Example even when the output of the gas to be supplied was increased, and an internal pressure fall from an early peak occurred earlier. In addition to that, a peak pressure in an early stage of deployment was also suppressed to be lower than in the Comparative Example, and this effect will contribute to reducing a damage value which the occupant experiences.

As described so far, compared with the Comparative Example, the Example allows rapid rise of the internal pressure of the main chamber from an early stage of air-bag deployment, thus making it possible to suppress excessive internal pressure rise upon contact with the occupant, thus realizing high occupant protection performance.

REFERENCE SIGNS LIST

10 Air-bag
11 Main chamber
12 Sub-chamber
13 Communication portion
14 Multilayer structure portion
15 Warp or weft
16 Weft or warp
17 Limiting line of thread
25 Internal joining portion
31 Internal pressure curve (main chamber) of an example
32 Internal pressure curve (sub-chamber) of an example
33 Internal pressure curve (main chamber) of a comparative example
34 Internal pressure curve (sub-chamber) of a comparative example
L Opening length of communication portion
W Width of multilayer structure
a1, a2 Four-layer portion
b Three-layer portion

The invention claimed is:

1. An air-bag (10) integrally formed by hollow weaving, comprising a main chamber (11) and a sub-chamber (12), wherein the main chamber and the sub-chamber are connected via a communication portion (13), the sub-chamber has a configuration that is expanded by a gas supplied from the main chamber via the communication portion, the communication portion or a region adjacent to the communication portion is made up of a multilayer woven structure portion (14), the multilayer woven structure portion is made up of a combination of three-layer weave and four-layer weave, the four-layer weave is disposed on at least one of a main chamber side or a sub-chamber side of the three-layer weave, and wherein when the main chamber inflates, an intermediate layer (a1) of the four-layer weave on the sub-chamber side and an intermediate layer (b) of the three-layer weave of the multilayer woven structure portion give rise to yarn slippage, such that weaves of the intermediate layer (a1) of the four-layer weave on the sub-chamber side and the intermediate layer (b) of the three-layer weave gather on the sub-chamber side of the multilayer woven structure portion, whereby the multilayer woven structure portion causes an opening of the communication portion to become smaller, and thus temporarily hinders the gas flowing into the sub-chamber.

2. A curtain air-bag device using the air-bag according to claim 1.

3. The air-bag according to claim 1, wherein one or more internal joining portions (25) each of which joins two pieces of fabric constituting the air-bag are disposed in a vicinity within 100 mm of the communication portion independently of a joining portion forming the communication portion.

4. A curtain air-bag device using the air-bag according to claim 3.

5. The air-bag according to claim 1, wherein the multilayer woven structure portion has a caught structure in which there are a first and a second plurality of warps and wefts inside the air-bag as a float yarn, the float yarn forming an outer base fabric, leaving the outer base fabric, and returning to the original outer base fabric, and in the caught structure of the multilayer woven structure portion the first plurality of warps (15) or wefts (15) existing as the float yarn are caught only one time on the second plurality of wefts (16) or warps (16) existing as the float yarn extending in a direction transverse to the communication portion, or the multilayer woven structure portion is formed by combining the caught structure of the multilayer woven structure portion into multiple stacks in a direction from the main chamber toward the sub-chamber.

6. A curtain air-bag device using the air-bag according to claim 5.

7. The air-bag according to claim 5, wherein one or more internal joining portions each of which joins two pieces of fabric constituting the air-bag base fabric are disposed in a vicinity within 100 mm of the communication portion independently of the multilayer woven structure portion forming the communication portion.

8. A curtain air-bag device using the air-bag according to claim 7.

9. The air-bag according to claim 1, wherein the multilayer woven structure portion has a structure in which two pieces of fabric are interconnected by arranging warps (17) or wefts (17), which constitute a hollow weave, to extend inside the air-bag from one of the two pieces of fabric to the other in a direction from the main chamber toward the sub-chamber, and wherein when the main chamber inflates, the warps (17) or wefts (17) are pulled, and then the multilayer woven structure portion causes the opening of the communication portion on the sub-chamber side to become smaller.

10. A curtain air-bag device using the air-bag according to claim 9.

11. The air-bag according to claim 9, wherein one or more internal joining portions each of which joins two pieces of fabric constituting the air-bag base fabric are disposed in a vicinity within 100 mm of the communication portion independently of the multilayer woven structure portion forming the communication portion.

12. A curtain air-bag device using the air-bag according to claim 11.

13. An air-bag integrally formed by hollow weaving, comprising a main chamber and a sub-chamber, wherein the main chamber and the sub-chamber are connected via a communication portion, the sub-chamber has a configuration that is expanded by a gas supplied from the main chamber via the communication portion, the communication portion or a region adjacent to the communication portion is made up of a multilayer woven structure portion, wherein the multilayer woven structure portion is made of a three-layer weave, and wherein when the main chamber inflates, an intermediate layer (b) of the three-layer weave of the multilayer woven structure portion gives rise to yarn slippage, such that weaves of the intermediate layer (b) of the three-layer weave gather on the sub-chamber side of the multilayer woven structure portion, whereby the multilayer woven structure portion causes an opening of the communication portion to become smaller, and thus temporarily hinders the gas flowing into the sub-chamber.

14. A curtain air-bag device using the air-bag according to claim 13.

15. The air-bag according to claim 13, wherein one or more internal joining portions each of which joins two pieces of fabric constituting the air-bag are disposed in a vicinity within 100 mm of the communication portion independently of the multilayer woven structure portion forming the communication portion.

16. A curtain air-bag device using the air-bag according to claim 15.

* * * * *